(12) United States Patent
Shige et al.

(10) Patent No.: US 8,291,785 B2
(45) Date of Patent: Oct. 23, 2012

(54) BALL SCREW

(75) Inventors: Yoshifumi Shige, Kashiba (JP); Katsura Koyagi, Kashiwara (JP); Atsushi Sakuta, Kani (JP)

(73) Assignee: Jtekt Corporation, Osaka-Shi, Osaka (JP)

( * ) Notice: Subject to any disclaimer, the term of this patent is extended or adjusted under 35 U.S.C. 154(b) by 341 days.

(21) Appl. No.: 12/318,236

(22) Filed: Dec. 23, 2008

(65) Prior Publication Data

US 2009/0158874 A1 Jun. 25, 2009

(30) Foreign Application Priority Data

Dec. 25, 2007 (JP) ................................. 2007-331746

(51) Int. Cl.
*F16H 1/24* (2006.01)

(52) U.S. Cl. ................................. 74/424.82; 74/424.87

(58) Field of Classification Search ............... 74/424.71, 74/424.81, 424.82, 424.85, 424.87, 424.83
See application file for complete search history.

(56) References Cited

U.S. PATENT DOCUMENTS

| | | | | |
|---|---|---|---|---|
| 2,497,424 A | * | 2/1950 | Terdina et al. | ................ 74/89.37 |
| 3,053,105 A | * | 9/1962 | Cole | ........................ 74/424.86 |
| 3,732,744 A | | 5/1973 | Rowland | |
| 3,762,227 A | | 10/1973 | Bohnhoff | |
| 4,266,437 A | * | 5/1981 | Obergfell | ..................... 74/89.37 |
| 5,379,660 A | * | 1/1995 | Ishikawa | ....................... 74/89.36 |
| 7,249,533 B2 | * | 7/2007 | Inoue et al. | ................. 74/424.85 |
| 2001/0029797 A1 | | 10/2001 | Lange et al. | |
| 2004/0194460 A1 | | 10/2004 | Ito et al. | |
| 2004/0211280 A1 | * | 10/2004 | Nishimura et al. | ......... 74/424.82 |
| 2005/0268737 A1 | * | 12/2005 | Inoue et al. | ................... 74/89.23 |
| 2008/0092679 A1 | | 4/2008 | Tateishi et al. | |
| 2010/0251845 A1 | * | 10/2010 | Adler et al. | ................ 74/424.82 |

FOREIGN PATENT DOCUMENTS

| | | |
|---|---|---|
| JP | 60-37653 | 3/1985 |
| JP | 05-42804 | 6/1993 |
| JP | 2002-31207 | 1/2002 |
| JP | 2005-121216 | 5/2005 |
| JP | 2005-299720 | 10/2005 |

OTHER PUBLICATIONS

European Search Report dated Nov. 12, 2009.
Notification of Reasons for Refusal dated Jan. 31, 2012, with Partial English Translation.

* cited by examiner

*Primary Examiner* — Thomas B Will
*Assistant Examiner* — Abigail A Risic
(74) *Attorney, Agent, or Firm* — McGinn IP Law Group, PLLC

(57) ABSTRACT

A ball screw includes a screw shaft, in which a thread groove is formed in an outer peripheral face thereof, that includes a small-diameter portion with a diameter smaller than an outer diameter of the screw shaft formed integrally at one end of the screw shaft; a nut, through which the screw shaft passes, having a thread groove formed in an inner peripheral face thereof; a plurality of balls disposed in a ball passage formed by the thread groove of the screw shaft and the thread groove of the nut; and a ring-shaped stopper, immovably fitted on the small-diameter portion, that prevents the nut from moving.

12 Claims, 3 Drawing Sheets

BALL SCREW

INCORPORATION BY REFERENCE

The disclosure of Japanese Patent Application No. 2007-331746 filed on Dec. 25, 2007 including the specification, drawings and abstract is incorporated herein by reference in its entirety.

BACKGROUND OF THE INVENTION

1. Field of the Invention

The invention relates to a ball screw.

2. Description of the Related Art

In a conventional ball screw with a nut, which has a thread groove formed in an inner peripheral face thereof, fitted on a screw shaft having a thread groove formed in the outer peripheral face thereof, and with a plurality of balls disposed in a ball passage formed by the thread groove of the screw shaft and the thread groove of the nut.

In the above-described ball screw, if the thread groove is formed along an entire length of the screw shaft, the nut may move beyond a stroke end and the balls may fall out from the end of the thread groove of the screw shaft, for example, when the ball screw is inspected, transported, or mounted on an actuator.

To address this problem, Japanese Patent Application Publication No. 2005-121216 (JP-A-2005-121216) describes the reduction of the thread groove width at the ends of the screw shaft through plastic deformation of screw head portions adjacent to the thread groove.

In the ball screw according to JP-A-2005-121216, the balls may be prevented from falling out from the region at the end of the thread groove having a reduced width, even if the thread groove is formed along the entire length of the screw shaft.

However, the plastic deformation of the screw head portions requires an additional major step. Furthermore, if the nut reaches a stroke end, the balls may become wedged in the region where the thread groove width has been reduced and thereby damaged.

SUMMARY OF THE INVENTION

The invention provides a ball screw that prevents the balls from falling out from an end of a thread groove formed along the entire length of a screw shaft without requiring a major step of providing the ball screw.

One aspect of the invention relates to a ball screw. This ball screw includes a screw shaft, in which a thread groove is formed in an outer peripheral face thereof, that includes a small-diameter portion with a diameter smaller than an outer diameter of the screw shaft formed integrally at one end of the screw shaft; a nut, through which the screw shaft passes, having a thread groove formed in an inner peripheral face thereof; a plurality of balls disposed in a ball passage formed by the thread groove of the screw shaft and the thread groove of the nut; and a ring-shaped stopper, immovably fitted on the small-diameter portion, that prevents the nut from moving.

The ball screw may be an end cap-type ball screw, a tube-type ball screw, or a top-type (deflector-type) ball screw.

In an end cap-type ball screw, the nut and end caps are mounted at both ends of the nut. The nut and the end caps are endowed with a function of causing the balls to circulate. The end caps are provided with ball scoops that protrude into the thread groove of the screw shaft to scoop up the balls.

According to the above construction, when the nut reaches a stroke end, the ball scoop of the corresponding end cap hits against the stopper, which stops the nut from moving. As a result, the balls are prevented from falling out.

In a tube-type ball screw, the balls circulate through a tube mounted on the nut. A tip portion of the tube protrudes into the thread groove of the screw shaft to scoop up the balls.

According to the foregoing construction, when the nut reaches a stroke end, the tip portion of the tube or one of the balls hits against the stopper, thereby stopping the nut. As a result, the balls are prevented from falling out.

In a top-type ball screw guides the balls to a top (deflector) inserted in the nut and causes the balls to circulate lead by lead.

According to the foregoing construction, when the nut reaches a stroke end, one of the balls hits against the stopper to stop the nut. As a result, the balls are prevented from falling out.

In any of the described ball screws, the stopper can prevent the balls from falling out from the end of a thread groove that is formed along the entire length of the screw shaft.

Further, according to the foregoing construction, nothing more is required than to immovably fit the stopper on the small-diameter portion integrally formed at the end of the screw shaft. Therefore, it is not necessary to plastically deforming screw head portions.

In the foregoing construction, the small-diameter portion may have an outer diameter smaller than a groove bottom diameter of the thread groove of the screw shaft. The stopper may have an outer diameter larger than the groove bottom diameter and smaller than the outer diameter of the screw shaft.

In the above construction, the stopper may be made of an elastic material, such as, for example, rubber. Thus the stopper may be a rubber o-ring.

According to the foregoing construction, even when one of the balls or a component on the nut side hits against the stopper, damage to the ball or component resulting from the impact is prevented.

Further, in the foregoing construction, the stopper may be made of a relatively soft metal or a synthetic resin.

According to the foregoing construction, even if one of the balls or a component on the nut side hits the stopper, damage due to the impact is minimized. As a result, the ball or the component is not damaged.

According to the ball screw of the invention, as described above, it is possible to prevent the balls from falling out from the end of a thread groove that is formed along the entire length of the screw shaft.

BRIEF DESCRIPTION OF THE DRAWINGS

The foregoing and further features and advantages of the invention will become apparent from the following description of an example embodiment with reference to the accompanying drawings, wherein like numerals are used to represent like elements and wherein.

DETAILED DESCRIPTION OF EMBODIMENT

An end cap-type ball screw according to the embodiment of the invention will be described hereinafter with reference to the drawings.

Figure 1:
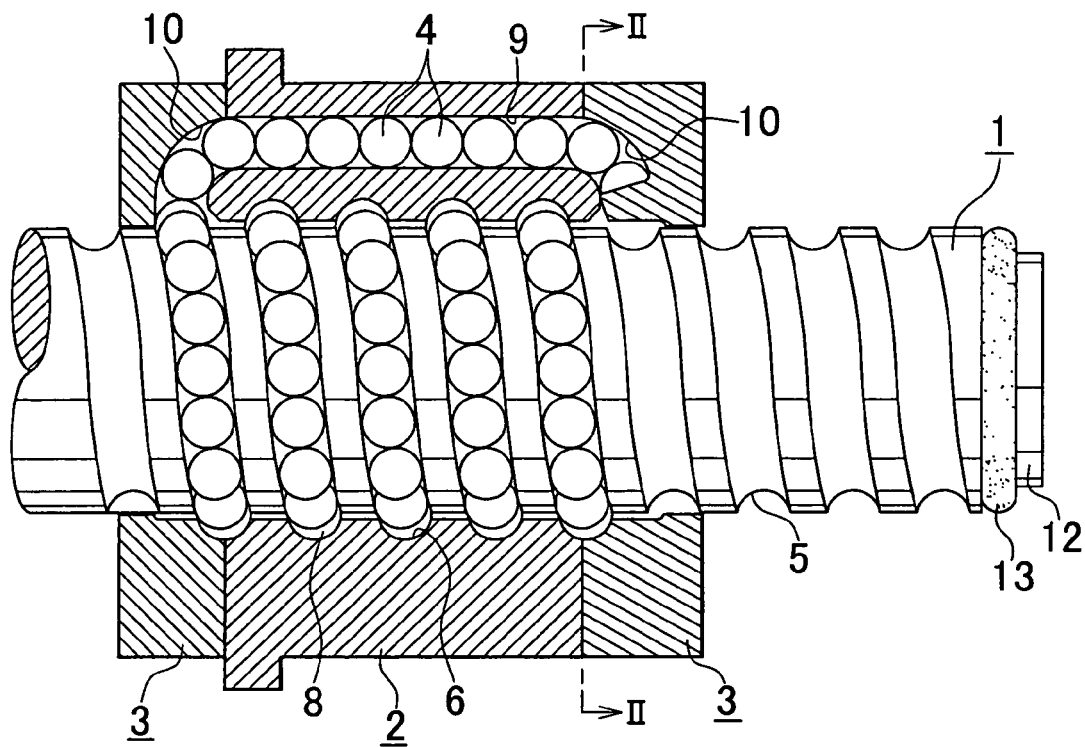
FIG. 1 is a longitudinal sectional view of a main region of an end cap-type ball screw according to the embodiment of the invention.
Figure 2:
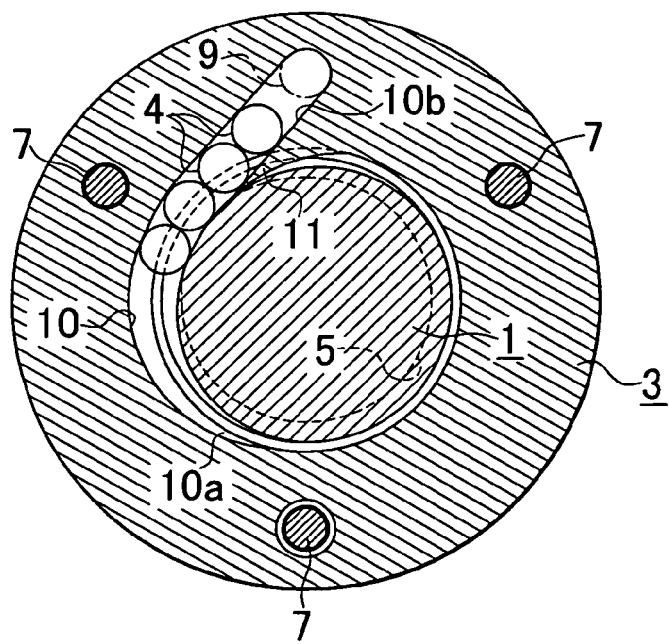
FIG. 2 is a sectional view taken along a line II-II of FIG. 1.

FIG. 1 is a longitudinal sectional view of a main region of the ball screw. FIG. 2 is a transverse sectional view of the main region of the ball screw.

The ball screw according to this embodiment of the invention includes a steel screw shaft 1, a steel nut 2, a pair of synthetic resin end caps 3, and a large number of balls 4.

The screw shaft 1 is a solid-core shaft with a circular transverse section. A single thread groove (male thread groove) 5 is formed in an outer peripheral face of the screw shaft 1 along an entire length of the screw shaft 1. The nut 2 assumes a cylindrical shape, and is fitted radially outward of the screw shaft 1 with a narrow clearance left between the nut 2 and the screw shaft 1. A single thread groove (female thread groove) 6 corresponding to the male thread groove 5 is formed in an inner peripheral face of the nut 2. The end caps 3 are annular short cylinder-like bodies that are identical in shape to each other. The end caps 3 are fixed to both axial end faces of the nut 2 respectively using couplers such as bolts 7 or the like.

A space between the female thread groove 6 of the nut 2 and the male thread groove 5 of the screw shaft 1 constitutes a main passage (ball passage) 8 on which the balls 4 roll. A return passage 9 is formed at one location through a peripheral wall of the nut 2. The return passage 9 is a through-hole with a circular cross-section, which penetrates the nut 2 along its entire axial length. Turnaround passages 10, through which the main passage 8 communicates with the return passage 9, are formed in the end faces of the end caps 3 on the nut 2 side respectively. The turnaround passages 10 are circular regions 10a leading to ends of the female thread groove 6 of the nut 2 respectively and extending circumferentially along inner peripheries of the end caps 3 respectively, and linear regions 10b extending linearly from the circular regions 10a to that region of the nut 2, which corresponds to the return passage 9 respectively. Ball scoops 11 that scoop up the balls 4 from the male thread groove 5 to guide the balls 4 into the linear regions 10b are formed on the inner peripheries of the end caps 3 in boundary regions between the circular regions 10a of the turnaround passages 10 and the linear regions 10b of the turnaround passages 10 respectively. The ball scoops 11 protrude into the male thread groove 5.

The balls 4 are disposed in the main passage 8, the return passage 9, and the turnaround passages 10. The balls 4 that roll on the main passage 8 guide the relative rotation of the screw shaft 1 and the nut 2.

Due to relative rotation of the screw shaft 1 and the nut 2, the screw shaft 1 and the nut 2 move relative to each other in the axial direction of the screw shaft. Then, the balls 4 that roll on the main passage 8 are turned around in the turnaround passage 10 of one of the end caps 3, are introduced into the return passage 9 of the nut 2, and move to the other end cap 3 side in the return passage 9. The balls 4 that have moved through the return passage 9 are turned around in the turnaround passage 10 of the other end cap 3, and are reintroduced into the main passage 8.

Figure 3:
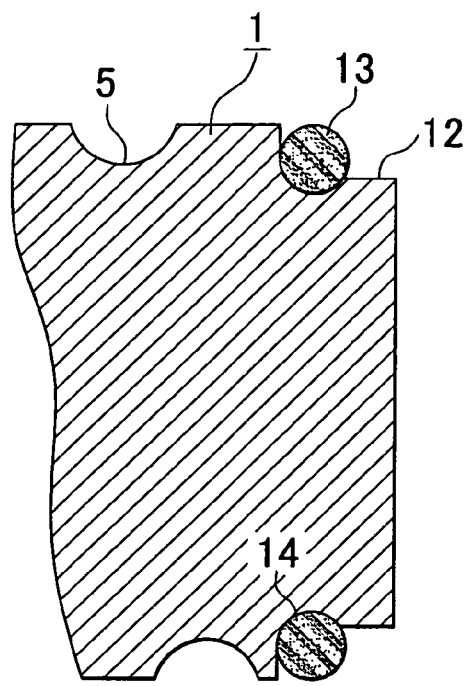
FIG. 3 is a sectional view showing part of FIG. 1 on an enlarged scale.

As shown in FIG. 1, a small-diameter portion 12 is formed integrally at an end of the screw shaft 1, and a ring-shaped stopper 13 is immovably fitted on the small-diameter portion 12. As shown in FIG. 3, the small-diameter portion 12 has an outer diameter smaller than a thread bottom diameter of the male thread groove 5. A groove 14 with a rounded cross-section is formed in an outer peripheral face of the small-diameter portion 12 on the screw shaft 1 side. The stopper 13 is immovably fitted in this groove 14.

The stopper 13 may be constructed as an O-ring. The stopper 13 has an outer diameter larger than the thread bottom diameter of the male thread groove 5 and equal to or slightly smaller than an outer diameter of the screw shaft 1.

Because the outer diameter of the small-diameter portion 12 is smaller than the thread bottom diameter of the male thread groove 5, the small-diameter portion 12 does not hinder polishing of the male thread groove 5.

In the aforementioned ball screw, even when the nut 2 reaches a stroke end, for example, if the ball screw is inspected, transported, or mounted on an actuator, the ball scoop 11 of the corresponding end cap 3 hits the stopper 13, thereby stopping the nut 2. As a result, the balls 4 are prevented from falling out. Further, the O-ring constituting the stopper 13 is elastic. Therefore, even if the ball scoop 11 hits the stopper 13, damage resulting from the impact is minimized.

Figure 4:
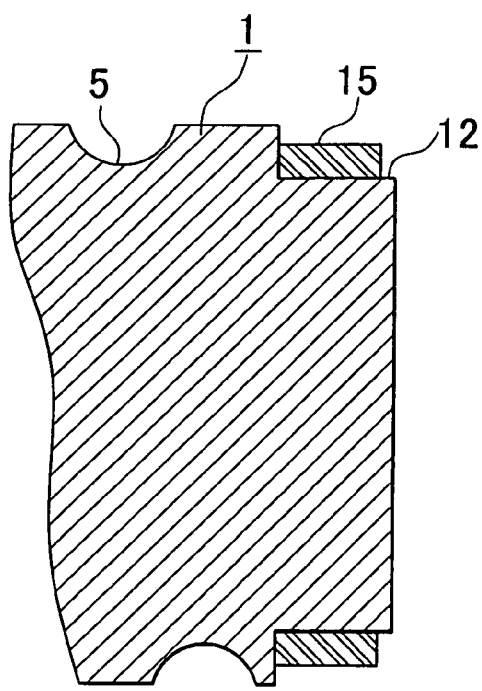
FIG. 4, which corresponds to FIG. 3, shows a first modified example of a stopper.

FIG. 4 shows a first modified example of the stopper.

A stopper 15 in this modified example is constructed as a cylindrical ring made of a metal or a synthetic resin. No groove or the like is formed in the outer peripheral face of the small-diameter portion 12. The stopper 15 is immovably press-fitted on the small-diameter portion 12.

The stopper 15 has an outer diameter larger than the thread bottom diameter of the male thread groove 5 and smaller than the outer diameter of the screw shaft 1.

According to the foregoing construction, when the nut 2 reaches a stroke end, the ball scoop 11 of a corresponding one of the end caps 3 hits against the stopper 15 to stop the nut 2 from moving. As a result, the balls 4 are prevented from falling out. In the case where the stopper 15 is made of a relatively soft metal or synthetic resin, even when the ball scoop 11 hits against the stopper 15, an impact resulting therefrom is alleviated. As a result, the ball scoop 11 is not damaged.

Figure 5:
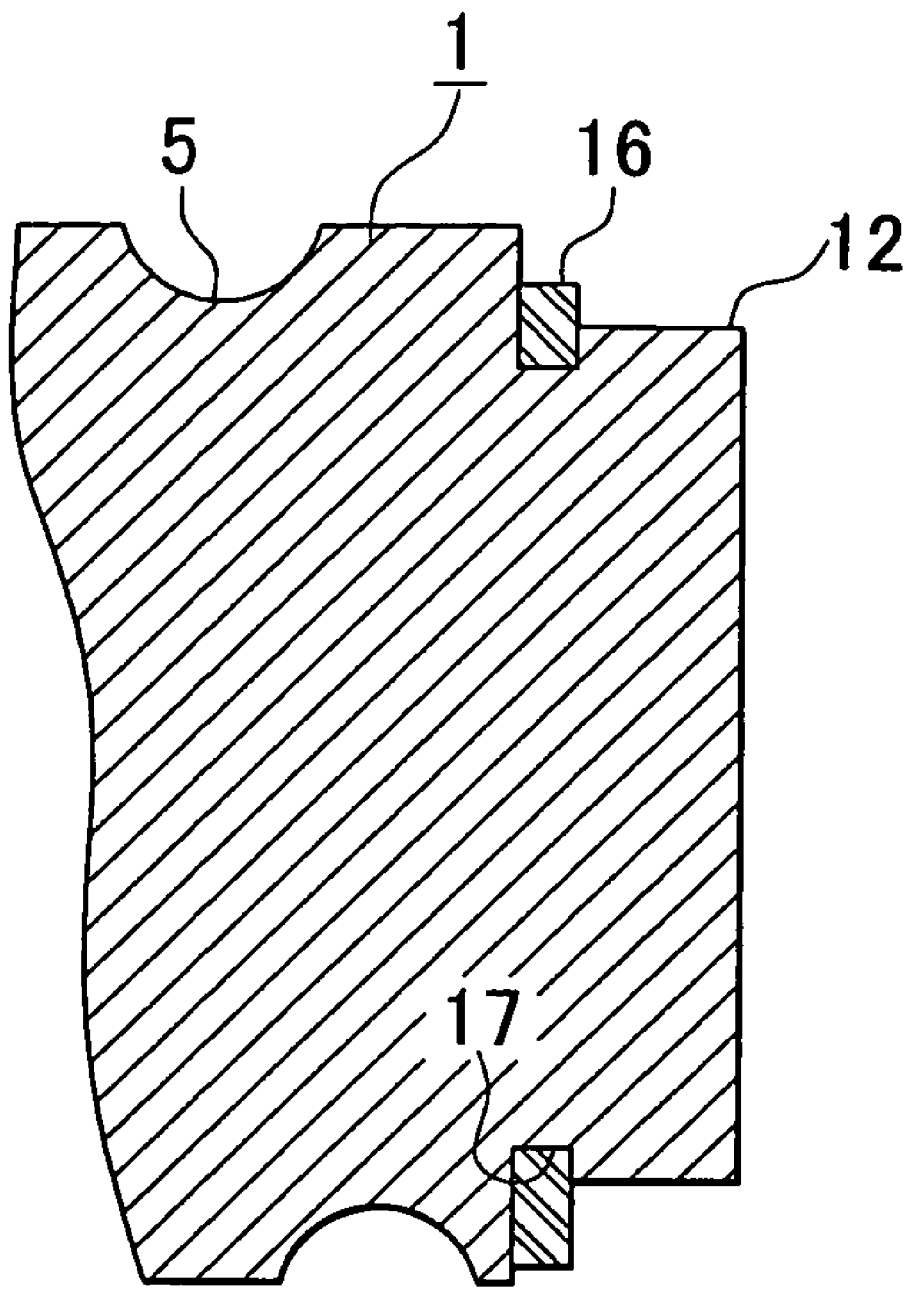
FIG. 5, which corresponds to FIG. 3, shows a second modified example of the stopper.

FIG. 5 shows a second modified example of the stopper.

A stopper 16 in this modified example is constructed as a retaining ring made of a metal or a synthetic resin. A groove 17 with a rectangular cross-section is formed in the outer peripheral face of the small-diameter portion 12 on the screw shaft 1 side. The stopper 16 is immovably fitted in this groove 17.

The stopper 16 has a minimum outer diameter (the outer diameter of a concentric circle that is in contact with a region having a minimum outer diameter) larger than the thread bottom diameter of the male thread groove 5, and a maximum outer diameter (the outer diameter of a concentric circle that is in contact with a region having a maximum outer diameter) smaller than the outer diameter of the screw shaft 1.

In this case as well, when the nut 2 reaches a stroke end, the ball scoop 11 of the corresponding end cap 3 hits against the stopper 16 to stop the nut 2. As a result, the balls 4 are prevented from falling out. If the stopper 16 is made of a relatively soft metal or synthetic resin, even when the ball scoop 11 hits the stopper 16, damage resulting from the impact is minimized.

The construction of the ball screw according to the invention is not restricted to that of the foregoing embodiment, and may be modified as appropriate.

In the foregoing embodiment of the invention, the end cap-type ball screw is illustrated. However, the invention is also applicable to other types of ball screws such as a tube-type ball screw, a top-type ball screw, and the like. Further, the invention is also applicable to a multiple thread ball screw.

What is claimed is:

1. A ball screw comprising:
a screw shaft, in which a thread groove is formed in an outer peripheral face thereof, that includes a small-diameter portion with a diameter smaller than an outer diameter of the screw shaft formed integrally at one end of the screw shaft;
a nut, through which the screw shaft passes, the nut including:
   a thread groove formed in an inner peripheral face thereof; and
   a return passage penetrating the nut along an axial length of the nut, the return passage including a plurality of ball scoops that are positioned at both ends of the return passage, and that guide the balls in the ball passage to the return passage, the ball scoops protrude into the thread groove of the screw shaft;
a plurality of balls disposed in a ball passage formed by the thread groove of the screw shaft and the thread groove of the nut; and
a ring-shaped stopper, immovably fitted on the small-diameter portion such that, if the nut is positioned at an end of the thread groove, then the ring-shaped stopper contacts an internal portion of the nut and prevents the nut from moving.

2. The ball screw according to claim 1, wherein the stopper has an outer diameter larger than a thread bottom diameter of the thread groove of the screw shaft and equal to or smaller than the outer diameter of the screw shaft.

3. The ball screw according to claim 1, wherein the outer peripheral face of the small-diameter portion on the screw shaft side includes a groove with a rounded cross-section, and
wherein the stopper is immovably fitted in the rounded groove.

4. The ball screw according to claim 1, wherein the stopper comes into contact with one of the ball scoops to stop the nut.

5. The ball screw according to claim 1, wherein the stopper comprises a metal or a synthetic resin.

6. The ball screw according to claim 1, wherein the stopper comprises a single member which extends contiguously around a circumference of the small-diameter portion.

7. The ball screw according to claim 1, wherein the stopper comprises an outer diameter which is greater than a thread bottom diameter of the thread groove of the screw shaft and less than the outer diameter of the screw shaft.

8. The ball screw according to claim 1, wherein the return passage penetrates the nut along an entire axial length of the nut.

9. The ball screw according to claim 1, wherein the ring-shaped stopper has an outer radius less than an outermost radius of the thread groove of the screw shaft.

10. The ball screw according to claim 1, wherein the ring-shaped stopper is disposed so as to abut a portion of the screw shaft on which the thread groove is formed.

11. The ball screw according to claim 1, wherein the ring-shaped stopper contacts a ball scoop of the plurality of ball scoops.

12. A ball screw comprising:
a screw shaft, in which a thread groove is formed in an outer peripheral face thereof, that includes a small-diameter portion with a diameter smaller than an outer diameter of the screw shaft formed integrally at one end of the screw shaft;
a nut, through which the screw shaft passes, the nut including:
   a thread groove formed in an inner peripheral face thereof; and
   a return passage penetrating the nut along an axial length of the nut, the return passage including a plurality of ball scoops that are positioned at both ends of the return passage, and that guide the balls in the ball passage to the return passage, the ball scoops protrude into the thread groove of the screw shaft;
a plurality of balls disposed in a ball passage formed by the thread groove of the screw shaft and the thread groove of the nut; and
a ring-shaped stopper, immovably fitted on the small-diameter portion such that, if the nut is positioned at an end of the thread groove, then the ring-shaped stopper contacts an inner periphery of the nut and prevents the nut from moving.

* * * * *